United States Patent [19]

Eweryd

[11] Patent Number: 4,826,475
[45] Date of Patent: May 2, 1989

[54] SEALING MACHINE FOR GLUE-COATED MATERIAL IN SHEETS

[76] Inventor: Knut K. H. Eweryd, Östergåardsvägen 14, S-302 41 Halmstad, Sweden

[21] Appl. No.: 78,179
[22] PCT Filed: Nov. 3, 1986
[86] PCT No.: PCT/SE86/00502
§ 371 Date: Jun. 22, 1987
§ 102(e) Date: Jun. 22, 1987
[87] PCT Pub. No.: WO87/02943
PCT Pub. Date: May 21, 1987

[30] Foreign Application Priority Data

Nov. 6, 1985 [SE] Sweden .................. 8505242

[51] Int. Cl.⁴ .................. B31B 1/00; B31B 1/64
[52] U.S. Cl. .................. 493/10; 493/29; 493/35; 493/205; 493/206; 493/208
[58] Field of Search .................. 493/129, 135, 206, 205, 493/202, 197, 208, 189, 264, 266, 10, 29, 30, 35; 156/291, 216, 226, 227; 271/110, 115, 116

[56] References Cited

U.S. PATENT DOCUMENTS

| | | | |
|---|---|---|---|
| 2,114,625 | 4/1938 | Bergstein | 493/197 |
| 2,242,799 | 5/1941 | Moore | 493/208 |
| 3,985,067 | 10/1976 | Livio et al. | 493/30 |
| 4,011,798 | 3/1977 | Bambara et al. | 493/205 |

FOREIGN PATENT DOCUMENTS 687121 2/1953 United Kingdom .................. 493/208
1252322 11/1971 United Kingdom .

Primary Examiner—Frederick R. Schmidt
Assistant Examiner—Robert Showalter
Attorney, Agent, or Firm—Helfgott & Karas

[57] ABSTRACT

The present invention relates to a machine for sealing material in sheets, which have been pre-coated with beads of glue affected by heat, preferably electronically printed toner beads, the beads coming into engagement with each other after folding the sheet into such as the configuration of an envelope or the like, the sheet then being advanced into the machine for adhering the beads to each other. In accordance with the invention, the machine includes a first sealing zone (12) and a second sealing zone (13), which are arranged at 90° to each other with advancing means (36,38, 34,47) for conveying the respective sheet through the sealing zones, each sealing zone having one or more pairs of rotationally driven sealing discs (14,15,18,19,23,26). Each pair of sealing discs includes a first disc (14,15,23) heated by heating means, and a second, preferably freely rotating, disc (18,19,26) engaging against the first disc with a pre-settable pressure. In this way there is heat transfer from the first sealing disc to the second sealing disc so that when a sheet folded to envelope configuration is taken through the machine with the aid of said advancing means, the toner beads situated in this advancing direction are first caused to pass through respectively between said first sealing zone and in that the envelope is then given a new advancing direction at 90° to the previous one, the toner beads in the new direction being caused to pass through the second sealing zone.

12 Claims, 3 Drawing Sheets

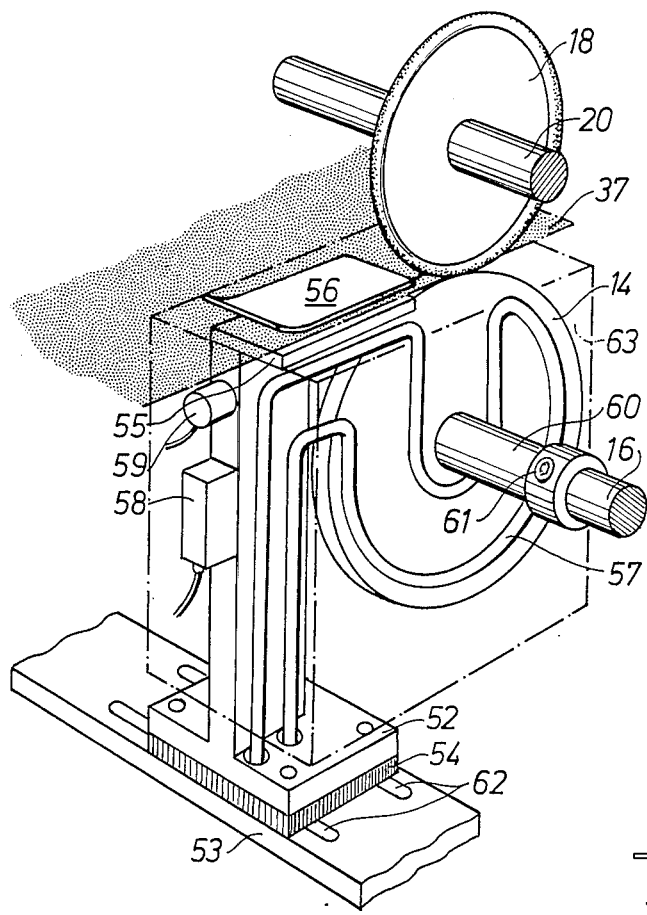
Fig. 6
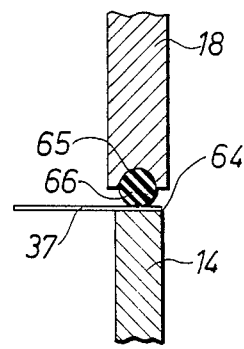
Fig. 7
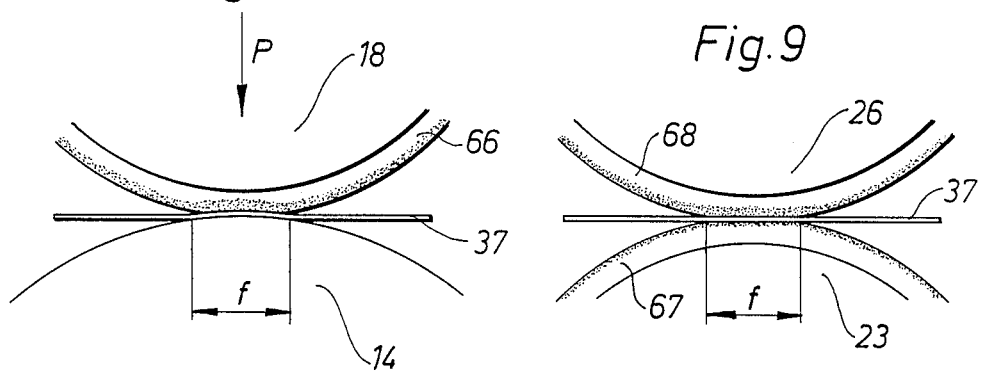
Fig. 8
Fig. 9

SEALING MACHINE FOR GLUE-COATED MATERIAL IN SHEETS

The extremely rapid development within the areas of information and communication with regard to printed sheets, messages of different kind, envelopes etc. has been accompanied by a similarly very large technical contribution with regard to the actual handling technique for the printed product. For example, it has been known for a long time to provide an envelope with perforated, tear-off edges from one and the same printed sheet, the edges of the sheet being coated before or after printing with some type of glue, e.g. of the moisture or hotmelt type. The moisture type is usually a water-based composition and is applied to the sheet without increase in temperature, sealing then taking place under a certain amount of pressure and possible the supply of heat. The hotmelt type is a plastic glue, which must be applied hot (in a liquid state) and which rapidly solidifies after application. For sealing, the glue must be heated once again with the simultaneous application of pressure.

The sheet which is to be sealed, i.e. glued together along the edges to form an envelope, is first folded so that two half portions of it come against each other, these portions then being pressed together to form an adhesive joint along the edges. The technique for this must be adjusted to the type of glue used. For the moisture type, only a light compression of the two sheet halves is required as a rule, with or without heating, whereas the hotmelt type requires heating to the melting point of the glue, or at least to its softening point, with simultaneous compression.

In recent years, printing in laser printers (so-called electronic printing) has been in a state of very rapid development. Electronic printing means that all text, with possible figures and pictures, is formed by a special kind of carbon powder, so-called toner, which is coated on to the paper surface electrostatically, using a now well-known technique, and is subsequently melted into the surface under heating and compression. The toner, which is a finely divided substance, comprises a composition of carbon powder and some suitable type of powdered plastics. Each printed portion of the paper surface will thus be coated with a thin, somewhat rolled-out layer of toner.

It has now been found that such a toner layer has a certain adhesive capacity, if it is once again heated during simultaneous compression. Particularly heavy adhesion is obtained if two toner coated surfaces are heated and pressed together.

In connection with this observation, a method has been developed by Rank-Xerox, which in principle signifies that the sheet, which is to be sealed to form an envelope, is coated with a comparatively narrow toner bead along the edges, or along the portions which are to be adhered to each other. The sheet is then folded so that the beads of toner coating are exactly opposite each other, after which a seal can be made. The method is described in the European patent application No. 85200178.4.

The present invention relates to a machine for sealing material in sheets which has been coated with toner beads by electronic printing for sealing the sheet to form an envelope.

The machine in accordance with the invention is characterized by an implementation such that the sheet, after folding to the intended envelope format, where two toner beads are always situated opposite each other, is first caused to pass through a first sealing zone, where one or more first toner beads are simultaneously sealed, and is subsequently caused to pass through a second sealing zone where one or more second toner beads, laid at 90° to the first toner beads, are simultaneously sealed. The second sealing zone is arranged at 90° to the first sealing zone, and in a stop position between both sealing zones there is arranged an advancing mechanism for rapid, automatic advancing of the envelope between the sealing zones.

Each sealing zone further includes heated, driven pairs of sealing discs, each pair comprising an upper and a lower disc adapted for elastic compression of the envelope toner beads, there being heating zones arranged for the toner beads in front of each pair of sealing discs.

The machine is further arranged with advancing means in the form of rolls or belt conveyors for advancing the sheet through the different zones.

The inventive machine is described in the following with reference to the accompanying figures and following claims.

Figure 5:
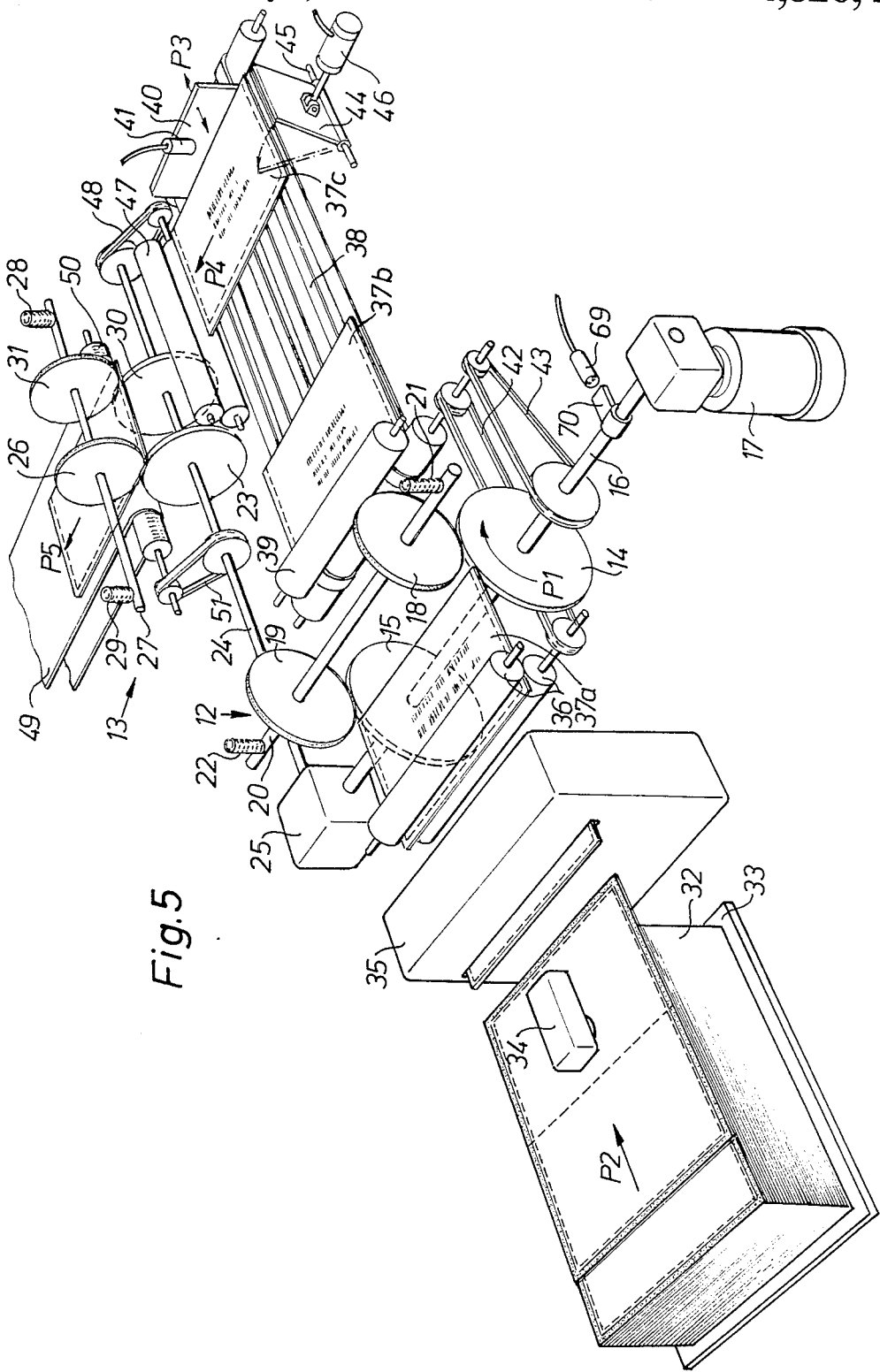

FIG. 5 schematically and in perspective illustrates the principle implementation of the machine.

FIG. 6 schematically and in perspective illustrates a pair of sealing discs with preheating zone, and an example of a heating method for these parts.

FIG. 7 is a section of portions of two sealing disc, where there is a lower disc with a plain contact surface and an upper disc arranged with a contact ring of elastic material.

FIG. 8 illustrates the zone of contact between the plain contact surface on the lower sealing disc and the elastic contact ring on the upper sealing disc with an envelope situated therebetween in a vertical projection and in connection with FIG. 7.

FIG. 9 illustrates analogously with FIG. 8 an arrangement with elastic contact rings arranged on both upper and lower sealing discs.

Figure 1:
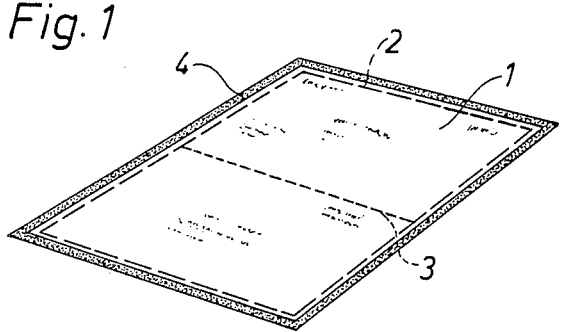
FIGS. 1 and 2 illustrate examples of electronic printed sheets coated with toner beads for sealing.

FIGS. 1-4 are included in this description solely to clarify the sealing process in the machine in accordance with the invention. In FIG. 1 a sheet 1 is pre-treated with tear-off perforations 2 along the edges of the sheet and optionally a folding perforation 3. Using electronic printing the sheet 1 has been provided with the desired text and simultaneously with a toner bead 4 along the edges. This bead can be comparatively narrow, e.g. 3 mm. In the example according to FIG. 1 the sheet is printed on both sides, and can be folded into an envelope along the folding perforations 3 at the centre of the sheet. With the printing on both sides, the address and the like can be arranged on the outside of the envelope.

Figure 2:
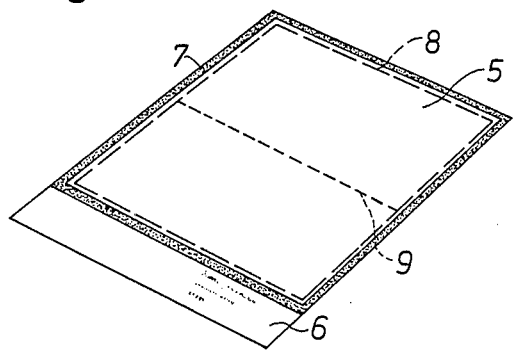
Figure 3:
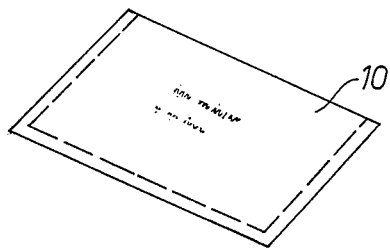
FIGS. 3 and 4 illustrate the sheets of FIGS. 1 and 2 after sealing in the inventive machine.
Figure 4:
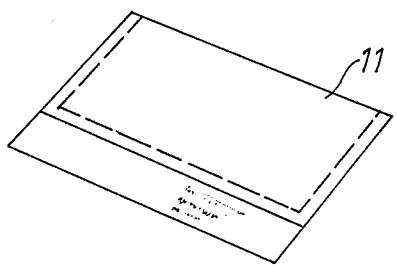

In the example according to FIG. 2, a sheet 5 is only printed on one side, there being an address area 6 arranged at one short edge of the sheet. Toner beads 7, tear-off perforations 8 and folding perforations 9 are arranged analogously with the example according to FIG. 1, but placed such that the address field 6 will be by itself and visible after folding about the folding perforations 9. FIGS. 3 and 4 illustrate two sealed envelopes 10, 11 after passage through the inventive sealing machine, the envelope 10 deriving from the alternative according to FIG. 1, and the envelope 11 to the alternative according to FIG. 2.

FIG. 5 schematically and in perspective illustrates the inventive sealing machine. A first sealing zone 12 and a second sealing zone 13 are arranged at 90° to each other. In the illustrated embodiment, the first sealing zone 12 has two lower sealing discs 14,15 which are rigidly mounted on a common shaft 16. The shaft 16 rotates according to the arrow P1 and is driven by a gear motor 17, as well as being conventionally mounted in a frame not illustrated in the Figure.

Vertically above the two lower sealing disc 14,15 there are mounted two upper sealing discs 18,19 such that they run against the peripheries of the lower sealing discs 14,15. The upper discs 18,19 are mounted for free rotation on a shaft 20, which is vertically movable with the aid of unillustrated guide means. Two adjustable compression springs 21,22 are arranged in connection with the shaft 20 so that it can press the upper sealing discs 18,19 against the lower ones 14,15 with a suitable pressure from the bias of the compression springs 21,22.

In communication with each of the sealing discs 14,15 there is further arranged a pre-heating zone and heating means, which is described in detail in connection with FIG. 6.

The second sealing zone 13, arranged at 90° to the first sealing zone 12, as indicted in FIG. 5, is built up in principle in the same way as the first sealing zone. A lower sealing disc 23 is rigidly mounted on a shaft 24, which is driven by the shaft 16 and the gear motor 17 via bevel gearing 25. In engagement with the periphery of the sealing disc 23 there is an upper sealing disc 26, which is mounted for free rotation on a shaft 27. The shaft 27 is vertically movable, with the aid of unillustrated guide means, and is pressed downwards by two compression springs 28,29 so that the upper sealing disc 26 engages against the periphery of the lower sealing disc 23 at a suitable pressure.

Similarly with corresponding lower sealing discs in the sealing zone 12, the lower sealing disc 23 is equipped with a pre-hating zone and heating means, which will be described in detail in connection with FIG. 6.

In the second sealing zone 13 there is also illustrated a lower guide disc 30 and an upper guide disc 31 adapted on the shafts 24 and 27 in the same way as the sealing discs 23,26. The function of the guide discs 30,31 will be described in the following.

FIG. 5 also illustrates known means for feeding and advancing material in sheets. A pile 32 of prepared and electronically printed sheets is stacked on a table 33, which raisable and loweable conventionally and automatically assumes a height adjusted to the height of the pile 32, which gradually decreases as the sheets are fed into the sealing machine. The sheets are taken automatically via a feeder 34 of known implementation into a folding means 35, as indicated by the arrow P2. The folding means 35 is also conventional, and folds the sheet in a desired manner, which can be set beforehand. After folding, the sheet is taken between two conveyor rolls 36 up to the sealing discs 14,15,18,19 in the first sealing zone 12. From here the sheet, which is now formed into an envelope 37, goes out on to a conveyor line 38 with a compression roll 39 and a stop rail 40 which carries an edge sensing means 41, preferably a photo cell, for the envelope.

It will be noted that the conveyor rolls 36, as well as the conveyor line 38, are driven with the aid of transmissions 42,43 not more closely described here, via the shaft 16 by the gear motor 17, so that an advancing rate is achieved for the envelope 37 which is synchronous with the revolutionary rate of the lower sealing discs 14,15. In addition, the stop rail 40 is directionally adjustable according to the double arrow P3 by means not illustrated in the Figure.

At the junction between the first sealing zone 12 and the second sealing zone 13 an advancing mechanism for the envelope 37 is arranged in connection with the stop rail 40, and consists of a plate 44 pivoting about a shaft 45 and actuated by a setting means, e.g. a solenoid 46. The solenoid 46 is automatically activated by a pulse from the edge sensing means 41, the plate 44 then rapidly advancing the envelope to a pair of conveying rolls 47, which in turn advance the envelope sufficiently for it to be gripped by the sealing discs 23,26 and guided by the guide discs 30,31 in the second sealing zone 13. The conveying rolls 47 are driven, which is schematically illustrated in FIG. 5, by a transmission 48 from the shaft 24 at a rate substantially synchronous with the advancing rate in the first sealing zone 12.

Directly joining on to the second sealing zone 13 there is a conveyor belt 49, which runs over two rolls, of which one roll 50 is visible in FIG. 5 and is driven at a suitable rate by the shaft 24 via transmission 51.

It has already been mentioned that each pair of sealing discs is arranged with a pre-heating zone and means for heating both the sealing discs and pre-heating zone. An example of a solution to these problems is illustrated in FIG. 6, with certain reference characters taken from FIG. 5. There is thus illustrated in FIG. 6, in perspective and to a larger scale, the lower sealing disc 14 and the upper sealing disc 18 with associated shafts 16 and 20. A fixed slide plate 55 and a vertically movable slide plate 56 are mounted on a bracket 52 fastened to a carrying rail 53 via an intermediate heat-insulating plate 54, mutually opposing surfaces of the glide plates 55,56 being flush with a common contact line for the sealing discs 14,18. The vertically movable slide plate 56 bears with a suitable pressure against a passing sheet 37, which thus will be subject to a given compression between the slide plates 55,56. The fixed slide plate 55 is mounted on the bracket 52 such that good heat transfer is obtained.

On one side, alternatively both sides, of the bracket 52 there is arranged on electrical heating element 57, a so called heating tube, implemented such that by radiation and convection it heats both the brackets 52 and the lower sealing disc 14. As illustrated by the Figure, the heating element 57 is bent into a double U-shape. The reason for this is that the heating element will then be easily replaceable, without needing to dismantle the shaft 16 and associated heating discs. For controlling the temperature, i.e. the heating power supply, a thermostat 58 and an overheating protector 59 are mounted with good heat contact on the bracket 52.

It will also be seen from FIG. 6 that the lower sealing disc 14 is arranged with a hub 60 having a setscrew 61 or the like, so that the sealing disc may be moved along the shaft 16 to a desired position. Analogous, but not more closely described displacement facilities for the upper sealing disc 18 are provided. The bracket 52 is also similarly movable along the carrying rail 53 with the aid of elongate slots 62.

A heat-insulating casing 63 is also illustrated in FIG. 6 with dashed lines, and is attached to the bracket 52 such as to surround it and its associated heating element 57 as well as the lower sealing disc 14.

Means are illustrated in FIGS. 7-9 for providing the previously mentioned elastic compression under heat of the envelope toner beads. Mutually engaging portions of the lower sealing disc 14, the upper disc 18 and an envelope 37 during sealing are illustrated in FIG. 7 in section, and using previously used reference characters. Both sealing discs are made from metallic material with good heat conductivity, and the lower disc 14 is formed with a cylindrical contact area 64 in this case. The upper disc 18 is provided with a circumferential groove for accommodating an elastic ring 66 of heat-proof material, e.g. viton rubber. When the upper disc 18 is pressed against the lower disc 14 with a force P, in a manner already described, there is formed a pressure and heat transfer surface with a length f, due to the elasticity in the ring 66, for heating up and pressing together the toner beads on the envelope 37, as illustrated in FIG. 8.

Analogous with FIG. 8, there is illustrated in FIG. 9 an alternative embodiment applied as an example to the lower sealing disc 23 and the upper sealing disc 26 in the sealing zone 13, elastic rings 67,68 being arranged on both discs. This embodiment can be advantageous under certain conditions, which will be described in detail hereinafter.

The feed rate for the printed sheets from the pile 32, FIG. 5, via the feeder 34 can be controlled in different ways. In FIG. 5 there is illustrated a system with a capacitive transducer 69 and a metallic tongue 70 mounted on the shaft 16 to activate the transducer at the passage of each sheet. This solution signifies that a sheet is fed into the machine for each revolution of the shaft 16.

It will have been understood from the description that in each sealing zone only the lower sealing discs are heated directly by radiation and convection. The upper sealing discs obtain heat preferably via convection but also via the rolling contact with the lower sealing discs. It is obviously possible to arrange direct heating of the upper sealing discs as well, but practical attempts have shown that this is not necessary.

The function of the sealing machine, which will have been partially understood from the description so far, is the following. The machine is operated using known control techniques via push button and electrical wiring system not illustrated in the Figures. In starting up, current is first supplied to the gear motor 17 and to the heating element 57, FIG. 6. The feeder 34, FIG. 5, is automatically blocked until the thermostat 58, FIG. 6, gives a signal indicating that the right sealing temperature has been obtained at the sealing discs. The advance of sheets from the pile 32 can then be started automatically or by depressing a button. After passage through the folding means 35 the sheet goes as a folded envelope format in between the conveyor rolls 36, one position during the continuous advance being denoted by 37a in FIG. 5. Before insertion between the sealing disc 14,15,18,19 the envelope portions coated with toner beads pass between the hot glide plates 55,56 in FIG. 6, the bead then being pre-heated. During passage between the upper and lower sealing discs there is further heating under suitable application pressure, so that the toner beads partially melt and flow together, thus obtaining effective adhesion of both lateral toner beads on the envelope. The envelope is then taken on to the conveyor belt 38 while obtaining certain pressure from the pressure roll 39 (envelope position 37b) and is taken to a stop position denoted by 37c, which is determined by the position of the stop rail 40.

The edge sensor 47 reacts for this envelope position and gives a pulse to the solenoid 46, urging the plate 44 forwards to urge the envelope between the conveying rolls 47. Continuous further conveyance from these rolls takes the envelope to the sealing zone 13 with its pre-heating zone and sealing discs, i.e. to a sealing procedure analogous with the one described for the sealing zone 12, although with the difference that in the illustrated embodiment only one edge of the envelope is sealed. The guide discs 30 and 31 are arranged with a functional mode similar to that of the sealing discs 23,26 but without a pre-heating zone and supply of heat to the discs, these guide discs 30,31 being required to maintain the linear guidance of the envelope necessary for the passage through the sealing zone 13.

It will be understood that if a special envelope configuration requires more toner beads than what is apparent from the figures and description, more pairs of sealing discs can be arranged in both sealing zones. If this should be the case for the second sealing zone 13, it is clear that the guide discs 30,31 can be replaced by sealing discs and the pre-heating zone with its associated heating element.

The described sealing machine embodies an implementation principle which can be varied with regard to detail execution within the scope of the invention. As previously mentioned, the sheet advance can be controlled in different ways, for example. The machine may also be provided with a preselection counter, which stops the machine after a given number of sheets have been supplied to it. Similarly, a total quantity counter can be arranged.

It has also been mentioned that when starting the machine the gear motor 17 starts simultaneously as the current to the heating element for the lower sealing discs has been connected. The sealing disc thus rotate during heating. This is important, partly to obtain an even temperature in the discs, but also in order that the elastic ring will be working both during the heating-up period and during a subsequent cooling period. The machine is thus also suitably provided with automatic means, which switches off the current to the heating elements after terminated production but keeps the gear motor 17 in operation for a predetermined time, i.e. until the sealing discs have time to cool.

Paper is a material very sensitive to moisture and temperature. Depending on the fibre direction, portions of the paper sheet may be locally extended or shrunk according to temperature and moisture content. For this reason it has been found during practical trials to be suitable to form the sealing discs 23,26 in the sealing zone 13 with elastic rings according to FIG. 9. There is then obtained an elastic pressure distribution on both portions of the envelope 37, which in turn results in reduced risk of creasing along the sealed edge.

The sealing machine in accordance with the invention has been described in connection with electronically printed sheets with toner beads. It will be understood, however, that the machine, in unaltered implementation and with suitable settings for temperature and pressure for the sealing discs, can be used to advantage for sheets which have been coated with any type of thermosetting glue. It may be added that the sealing temperature for sheets coated with toner beads is about 180° and that the total time for passage of a sheet through the machine is under one second.

I claim:

1. A machine for sealing material in sheets, which have been coated with toner beads of heat-activated glue, the beads coming into engagement with each other after folding a sheet to an envelope format, the sheets then being taken into the machine for adhering the beads to each other, the machine comprising a first sealing zone and a second sealing zone positioned at 90° to each other, advancing means for conveying the sheet through the sealing zones, each sealing zone having at least one pair of rotationally driven sealing discs, said at least one pair including a first sealing disc and a second sealing disc, heating means for heating said first sealing disc, said second disc being a freely rotating sealing disc engaging against the first disc with a pre-adjustable pressure, wherein heat transfer takes place from the first disc to the second disc so that, when the sheet folded to the envelope format is taken through the machine with the aid of said advancing means, the toner beads of the sheet in an advancing direction are first caused to pass through the first sealing zone and the envelope-foled sheet is then given a new advancing direction extending at 90° to said advancing direction, the toner beads in the new advancing direction being caused to pass through the second sealing zone, each sealing zone including a heating zone which includes pre-heating means and final heating means, said pre-heating means being arranged in a pre-heating zone, the pre-heating zone including a first, fixed glide plate and a vertically movable second guide plate, the fixed glide plate being mounted with heat contact on a heated bracket, and surfaces of the glide plates facing towards each other being mounted substantially parallel to a tangent to a contact surface between the sealing discs.

2. Sealing machine as claimed in claim 1, wherein said toner beads on said sheets are electronically printed toner beads.

3. Sealing machine as claimed in claim 1, wherein a plurality of pairs of said sealing discs are provided.

4. Sealing machine as claimed in claim 3, wherein at least one of the discs in each pair is arranged above another disc of said pair, said at least one of said discs being provided with an elastic means along a circumference thereof, the elastic means being of heat resistance material, and said at least one of the sealing discs in each pair being urged against said another disc in an associated pair by settable means with a suitable force such that a compression surface of a predetermined length is formed between the one and another disc in each pair of the sealing discs.

5. Sealing machine as claimed in claim 4, wherein said at least one of the sealing discs is said second disc and said another disc is said first disc.

6. Sealing machine as claimed in claim 3, wherein the heating means are mounted in connection with the heated bracket and the first sealing disc in each pair and comprise heating tubes, a thermostat and an overheating protector for regulating a temperature for the glide plates and the first sealing discs.

7. Sealing machine as claimed in claim 1, wherein said advancing means include a means for changing the direction of the folded sheet movement, said changing means including a stop rail with an edge sensing means and said advancing means being provided with an activating device, each envelope-folded sheet being urged into the second sealing zone with the aid of a signal from the sensing means to the activating device when a forward edge of the folded sheet is sensed by the sensing means.

8. Sealing machine as claimed in claim 7, further including adjusting means to adjust said stop rail so that it is set in a direction of the first sealing zone for adapting to different envelope formats.

9. Sealing machine as claimed in claim 1, further including settable resilient means, with the aid of which a suitable force is obtained for urging the second sealing disc against the first sealing disc.

10. Sealing machine as claimed in claim 9, wherein said settable resilient means include compression springs.

11. Sealing machine as claimed in claim 7, wherein the edge sensing means includes a photo cell, said activating device comprising a solenoid and the said advancing means comprising a plate pivotable about a horizontal axis.

12. Sealing machine as claimed in claim 2, wherein a feed rate for the sheets with printed toner beads in the sealing machine is provided electronically by a signal from a transducer in co-action with a tongue mounted on a drive shaft which is common to said sealing zones so that a sheet is advanced into the machine for each revolution of the drive shaft.

* * * * *